(12) United States Patent
Grayson et al.

(10) Patent No.: US 10,448,352 B1
(45) Date of Patent: Oct. 15, 2019

(54) ENTERPRISE FABRIC CONFIGURED TO SUPPORT CELLULAR MOBILITY

(71) Applicant: Cisco Technology, Inc., San Jose, CA (US)

(72) Inventors: Mark Grayson, Berkshire (GB); Rajesh S. Pazhyannur, Fremont, CA (US); Srinath Gundavelli, San Jose, CA (US); Mickael James Graham, Bellevue Hill (AU)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/291,540

(22) Filed: Mar. 4, 2019

(51) Int. Cl.
*H04W 8/08* (2009.01)
*H04W 48/00* (2009.01)
*H04W 60/00* (2009.01)
*H04W 8/20* (2009.01)

(52) U.S. Cl.
CPC ............. *H04W 60/00* (2013.01); *H04W 8/08* (2013.01); *H04W 8/20* (2013.01)

(58) Field of Classification Search
CPC ....... H04W 84/042; H04W 8/08; H04W 8/20; H04W 60/00
See application file for complete search history.

(56) References Cited

U.S. PATENT DOCUMENTS

| | | | |
|---|---|---|---|
| 8,578,035 | B2 | 11/2013 | Miklos et al. |
| 9,838,314 | B1 | 12/2017 | Hooda et al. |
| 2013/0265997 | A1* | 10/2013 | Gu .................... H04W 36/0022 370/338 |
| 2016/0037328 | A1* | 2/2016 | Raveendran ............ H04W 8/08 370/328 |
| 2018/0091471 | A1 | 3/2018 | Hooda et al. |

OTHER PUBLICATIONS

3GPP Organizational Partners, "3rd Generation Partnership Project; Technical Specification Group Services and System Aspects; Local IP Access and Selected IP Traffic Offload (LIPA-SIPTO) (Release 10)", 3GPP TR 23.829 V10.0.1, Oct. 2011, 43 pages.

(Continued)

*Primary Examiner* — Gary Lafontant
(74) *Attorney, Agent, or Firm* — Edell, Shapiro & Finnan, LLC

(57) ABSTRACT

A mobility management entity (MME) controls an enterprise fabric. The MME receives from a mobile device via a cellular network a request to initiate an attach procedure. In response, the MME acquires from the mobile device a unique equipment identifier of the mobile device. The MME generates an enterprise identity for the mobile device based on the unique equipment identifier, and registers the enterprise identity in the enterprise fabric. The MME signals to a user plane function of the cellular network that the mobile device has been registered, to trigger the user plane function to acquire an Internet Protocol (IP) address of the mobile device based on the enterprise identity. The MME receives from the user plane function the acquired IP address. The MME sends to the mobile device, through the cellular network, an attach accept message that includes the acquired IP address for use by the mobile device.

20 Claims, 9 Drawing Sheets

(56) References Cited

OTHER PUBLICATIONS

Cisco, "Evolved Packet Data Gateway Overview", ePDG Administration Guide, StarOS Release 20, downloaded Jan. 22, 2019, 90 pages.
Craig Hill et al., Cisco, "Cisco Software-Defined Access Enabling Intent-based Networking", downloaded Jan. 22, 2019, 154 pages.
European Telecommunications Standards Institute, "Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 version 8.2.0 Release 8)", ETSI TS 123 272 V8.2.0, Jan. 2009, 48 pages.

* cited by examiner

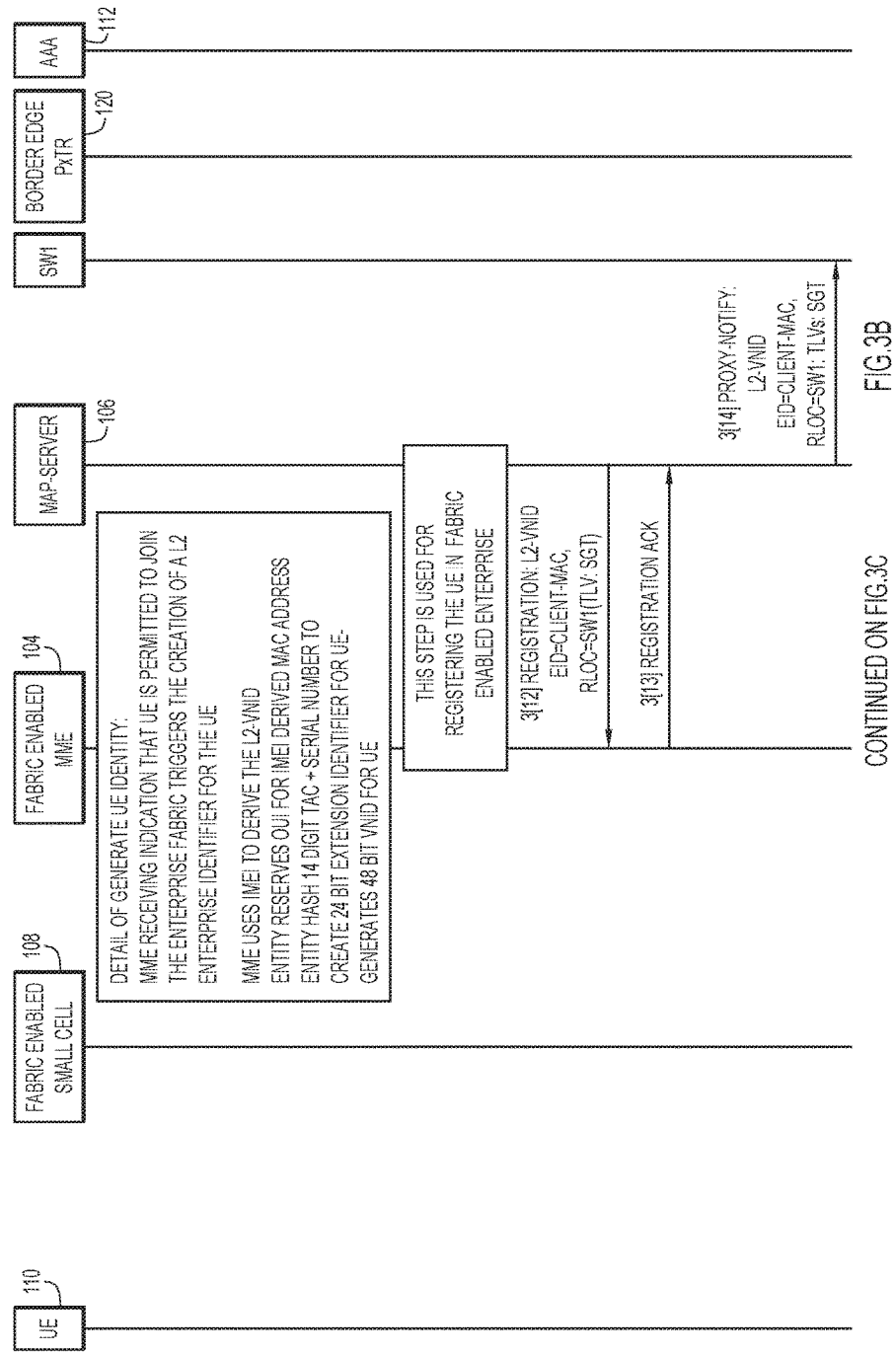

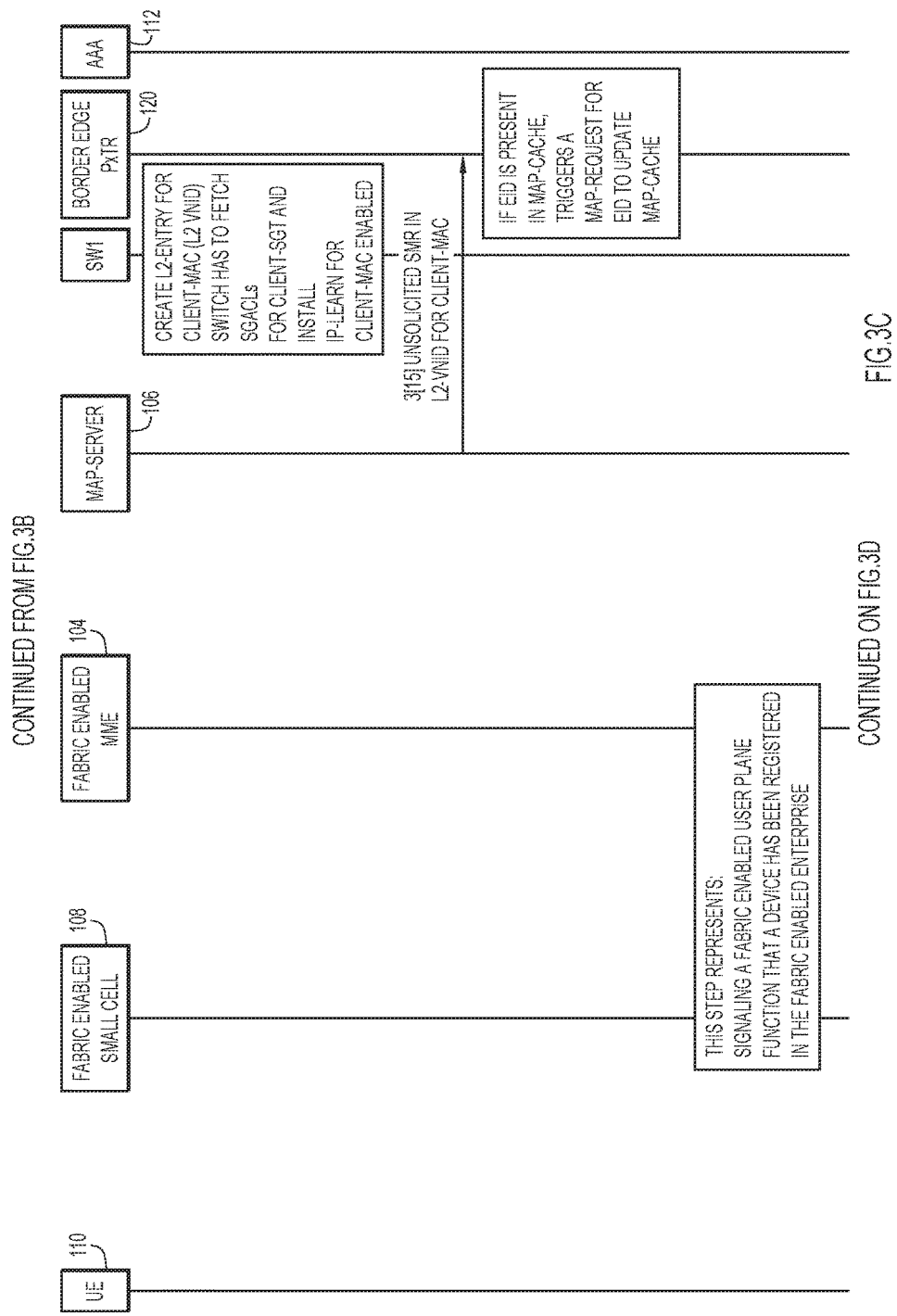

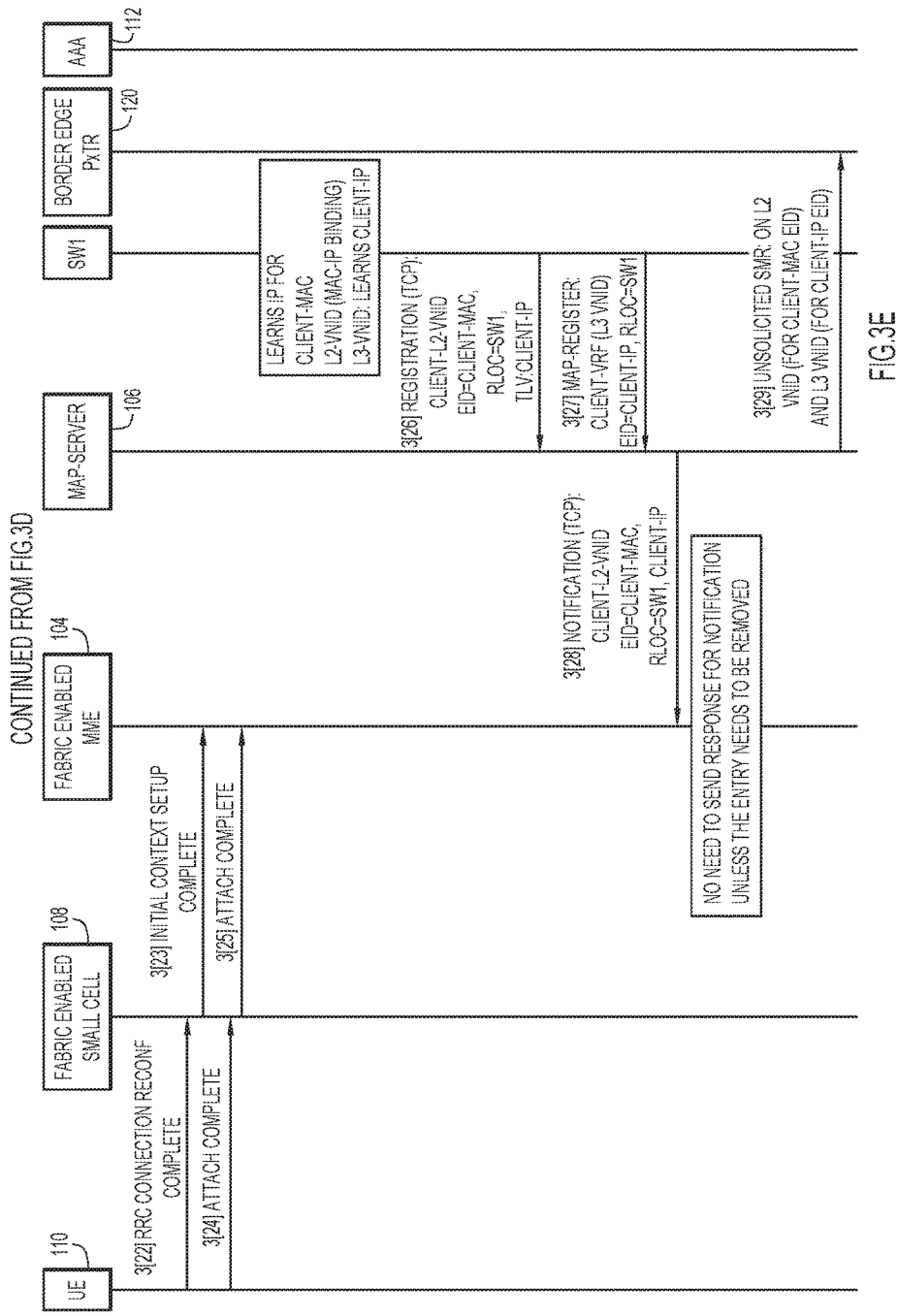

ENTERPRISE FABRIC CONFIGURED TO SUPPORT CELLULAR MOBILITY

TECHNICAL FIELD

The present disclosure relates to an enterprise fabric configured to support cellular mobility enterprise techniques to assist in congestion control of traffic flows in a network.

BACKGROUND

Private Long-Term Evolution (cellular) systems and enterprise fabrics are presently being deployed. Enterprise fabrics provide unified policy across wired networks and wireless networks, but not cellular networks. Some conventional cellular systems, e.g., 3rd Generation Partnership Project (3GPP), operate with a servicing gateway (SGW) and a packet data network gateway (PGW), which adds complexity to the systems, and makes it difficult to integrate the cellular systems into an enterprise fabric for purposes of unified policy.

BRIEF DESCRIPTION OF THE DRAWINGS

FIGS. 3A-3E collectively represent a thread diagram that expands on operations of the method of FIG. 2, according to an embodiment.

DESCRIPTION OF EXAMPLE EMBODIMENTS

Overview

A mobility management entity (MME) is configured to control an enterprise fabric. The MME receives from a mobile device via a cellular network a request to initiate an attach procedure. In response, the MME acquires from the mobile device a unique equipment identifier of the mobile device. The MME generates an enterprise identity for the mobile device based on the unique equipment identifier, and registers the enterprise identity in the enterprise fabric. The MME signals to a user plane function of the cellular network that the mobile device has been registered in the enterprise fabric, to trigger the user plane function to acquire an Internet Protocol (IP) address for the mobile device based on the enterprise identity. The MME receives from the user plane function of the cellular network a message indicating the acquired IP address. The MME sends to the mobile device via the cellular network an attach accept message that includes the acquired IP address for use by the mobile device. The attach accept message indicates that the attach procedure is complete, and that the enterprise fabric is configured to support a communication session with the mobile device through the cellular network.

Example Embodiments

Figure 1:
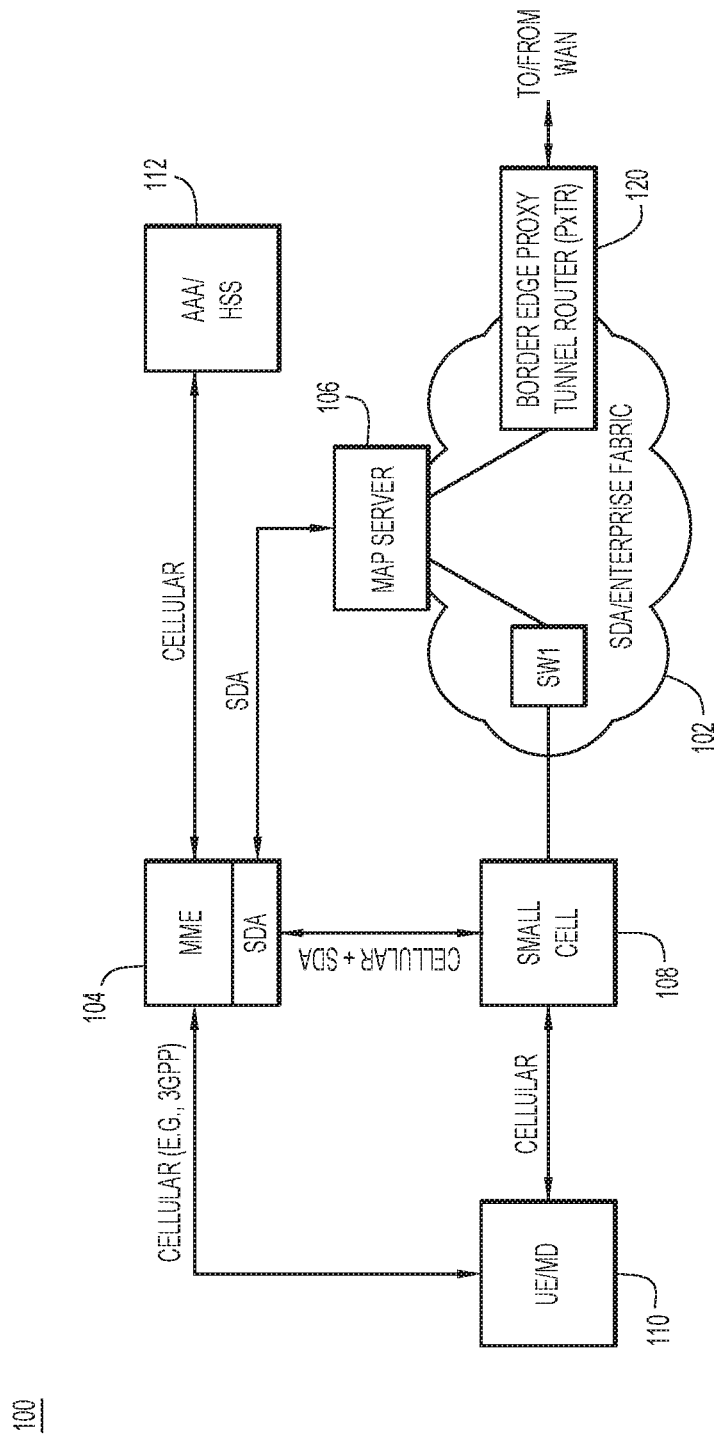
FIG. 1 is an illustration of a network environment, which includes an enterprise fabric configured to support cellular mobility and enforce fabric-wide policy, according to an example embodiment.

With reference to FIG. 1, there is an illustration of an example network environment 100, which includes an enterprise fabric configured to support cellular mobility and enforce fabric-wide policy. Network environment 100 includes an enterprise network fabric 102 (referred to simply as an "enterprise fabric"), a fabric-enabled mobility management entity (MME) 104 to provided overall control of enterprise fabric, a map server 106 accessible to the MME and the enterprise fabric, a portion 108 of a cellular/mobile phone network, cellular-enabled user equipment (UE) 110 (also referred to as a "mobile device" (MD)) to access the enterprise fabric via the cellular network, and an Authentication, Authorization, and Accounting (AAA) server 112 used by the MME to authenticate/authorize mobile device access to the enterprise fabric. The terms "cellular-enabled" or "cellular-based" mean configured to operate in accordance with presently known or hereafter developed cellular air-interface standards, such as the Long-Term Evolution (LTE) standards, and so on.

In the example of FIG. 1, portion 108 of the cellular network includes a 3GPP small cell, and mobile device 110 employs known or hereafter developed 3GPP protocols to communicate and connect with/attach to the 3GPP small cell. Also, in the 3GPP small cell example, AAA server 112 represents a home subscriber server (HSS). The HSS includes a database of user-related and subscriber-related information, such as subscriber profiles, and performs subscriber authentication and authorization. The HSS may also provide subscriber location information and Internet Protocol (IP) information.

Enterprise fabric 102 may employ Software Defined Access (SDA), provided by Cisco, for example. Thus, enterprise fabric 102 represents a programmable network that provides software-based policy and segmentation from an edge of the enterprise fabric to applications/devices external to the enterprise fabric that access the enterprise fabric. Enterprise fabric 102 may span different locations (or sites), such as a main campus, remote branches, and so on, each with multiple devices, services, and policies. Enterprise fabric 102 provides an end-to-end architecture that ensures consistency in terms of connectivity, segmentation, and policy across the different locations.

Enterprise fabric 102 includes a fabric edge switch SW1 on an edge of the enterprise fabric to connect with small cell 108. That is, switch SW1 is an access point for small cell 108 into enterprise fabric 102. Switch SW1 operates as a point of policy enforcement in enterprise fabric 102. That is, switch SW1 enforces enterprise fabric policy on traffic flowing through the switch, e.g., between mobile device 110 and enterprise fabric 102. FIG. 1 shows only one fabric edge switch SW1 and one small cell 108 for the sake of simplicity; however, it is understood that many fabric edge switches and their associated small cells may be connected to each other in network environment 100. In addition, enterprise fabric 102 includes, or is associated with, a border edge proxy tunnel router (PxTR) 120 that provides the enterprise fabric with access to external networks, which may include one or more wide area networks (WANs), such as the Internet (not shown in FIG. 1). Traffic flowing between enterprise fabric 102 and the external networks traverses PxTR 120.

Structurally, enterprise fabric 102 includes an overlay network built on top of an underlay network. The overlay network represents a virtual layer of enterprise fabric 102, and includes a fabric control plane, a fabric data plane, and a fabric policy plane. The overlay network may employ network tunneling technologies, such as, but not limited to, the Locator Identifier Separator Protocol (LISP) (e.g., which uses Resource Locators (RLOCs) and endpoint identifiers (EIDs)). The underlay network represents a physical layer of enterprise fabric 102, which includes physical network devices, such as routers and switches, to support traffic flows defined in the overlay network.

While MAP server 106 provides a central control point for mobility across enterprise fabric 102, MME 104 represents an access control point that integrates operationally with the map server. To this end, in one embodiment, MME 104 communicates with: (i) AAA/HSS 112 using cellular-based protocols, i.e., over an interface that employs a protocol defined for the cellular network; (ii) map server 106 using SDA-based protocols, i.e., over an SDA-defined interface; and (iii) small cell 108 using both cellular-based and SDA-based protocols, i.e., over both cellular and SDA interfaces. MME 104 communicates with mobile device 110 via small cell 108; for example, logically, non-access stratum (NAS) messages are exchanged between the mobile device and the MME, but these messages are transported over the access stratum between the mobile device and the small cell.

Map server (MS) 106 represents a distributed mapping database and service that accepts registration information for user equipment (e.g., mobile device 110), and stores mappings between namespace constructs used by the overlay of enterprise fabric 102. The mappings define tunnels for traffic flows across and in-and-out of enterprise fabric 102. In the LISP example, map server 106 stores mappings between RLOCs for switches (e.g., switch SW1) and EIDs for mobile devices (e.g., mobile device 110) associated with the switches. Typically, the EID includes a media access control (MAC) address of/provided by the mobile device.

Enterprise fabric 102 may also connect with wireless access points (APs), which serve WiFi-enabled clients. Such WiFi interoperability is not shown in FIG. 1 to reduce illustration complexity; however, it is understood that enterprise fabric 102 may support both the (cellular) small cells and WiFi clients at the same time.

According to existing 3GPP standards, conventional 3GPP networks and/or their supporting networks include a serving gateway (SGW) and a packet data network gateway (PGW). The PGW is an IP point of attachment that acts as an anchor for mobility between different systems, such as LTE and 3GPP. The PGW also provides policy enforcement. The SGW and the PGW add substantial complexity to the 3GPP network. Accordingly, embodiments presented herein omit the SGW and the PGW to provide a simplified architecture to support 3GPP small cell connectivity relative to conventional 3GPP networks. Most of the functions normally performed by the SGW and the PGW are handled by MME 104, although some of the functions are also integrated into/across map server 106, switch SW1, and a user plane function.

In addition, conventional enterprise fabrics rely on MAC address-based fabric constructs/mappings (e.g., switch address-endpoint address mappings) for traffic routing. The MAC address-based constructs are based, in part, on MAC addresses provided to the enterprise fabrics by mobile devices, e.g., WiFi-enabled devices, when the mobile devices connect to the enterprise fabrics. Similarly, enterprise fabric 102 relies on MAC address-based constructs; however, in the example of FIG. 1, mobile device 110 is cellular-based (e.g., a 3GPP terminal), and does not have a MAC address. Accordingly, embodiments presented herein generate a pseudo MAC address for mobile device 110 when the mobile device attaches to enterprise fabric 102 (via small cell 108), and the enterprise fabric uses the pseudo MAC address for constructs/mappings related to traffic routing.

Figure 2:
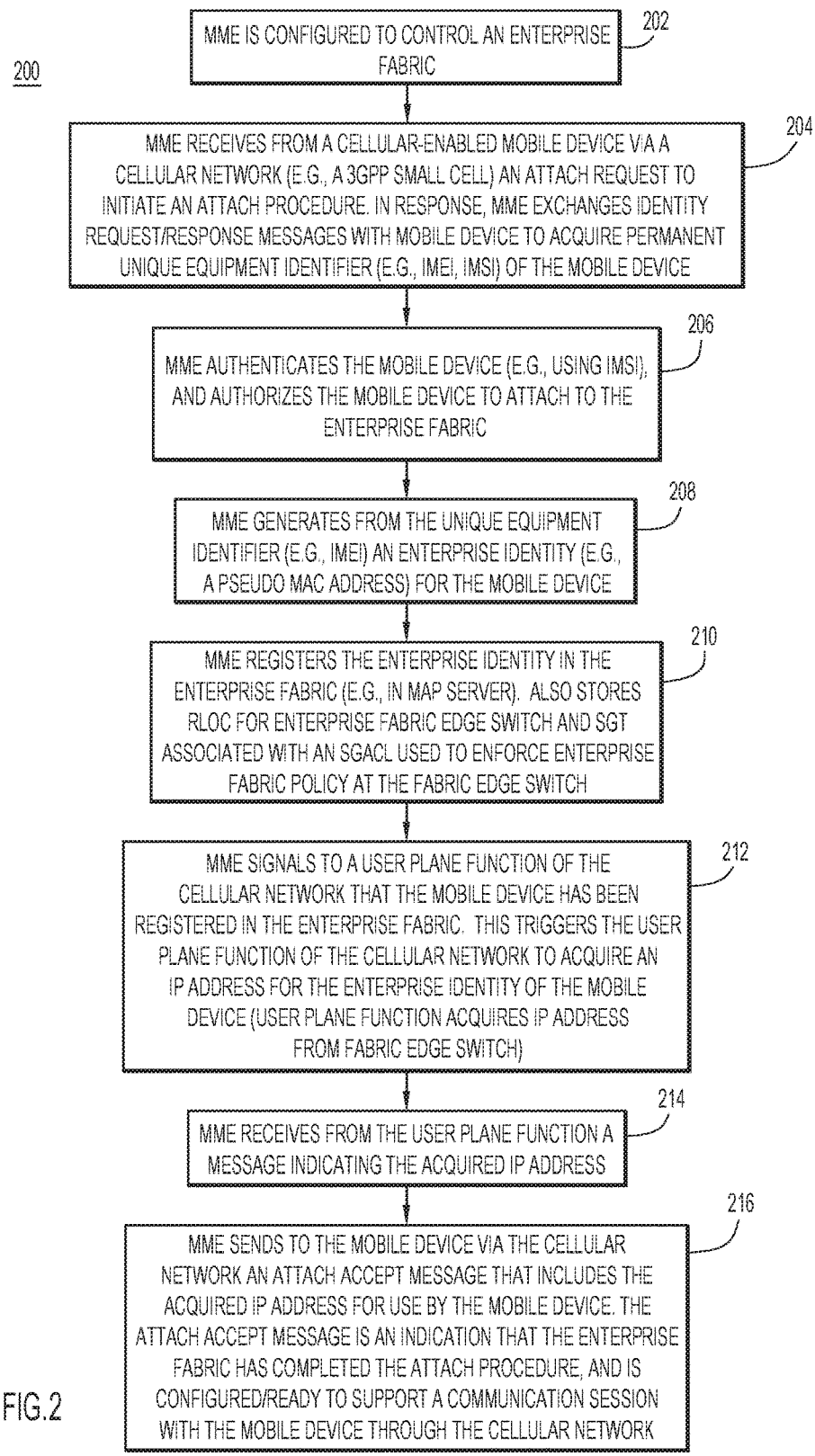
FIG. 2 is a flowchart of a high-level method of attaching a cellular-enabled mobile device to the enterprise fabric, performed by a mobility management entity (MME) that controls the enterprise fabric, according to an example embodiment.

With reference to FIG. 2, there is a flowchart of an example high-level method 200 of attaching a cellular-enabled mobile device (e.g., mobile device 110) to enterprise fabric 102, performed primarily by MME 104. Method 200 is performed without any interaction with an SGW and without any interaction with a PGW. Also, method 200 assumes that mobile device 110, e.g., a 3GPP terminal, does not have a MAC address.

At 202, MME 104 is configured to control enterprise fabric 102. For example, MME 104 is configured with network address information that enables the MME to communicate with map server 106, small cell 108, and AAA/HSS 112.

Initially, mobile device 110 sends to a cellular network an attach request to initiate an attach procedure, and the cellular network forwards the attach request to MME 104. In the example, of FIG. 1, mobile device 110 sends the attach request to small cell 108 (e.g., a 3GPP small cell), and the small cell forwards the attach request to enterprise fabric 102. Mobile device 110 includes in the attach request a temporary identifier of the mobile device.

At 204, MME 104 receives the attach request originated at mobile device 110. The attach request represents a request originated at mobile device 110 to attach to small cell 108 and enterprise fabric 102. Upon receiving the attach request, MME 104 initiates an attach procedure, implemented in this and next operations 206-216. MME 104 exchanges identity request/response messages with mobile device 110 to acquire permanent identifiers of the mobile device that will be used in place of the temporary identifier provided in the attach request. Specifically, MME 104 sends to mobile device 110 an identity request for the permanent identifiers. In response to the identity request, mobile device 110 sends to MME 104 (and MME 104 receives) an identity response that includes a permanent unique equipment identifier (UEI) of the mobile device that is programmed into the mobile device. In an example, the unique equipment identifier includes an International Mobile Equipment Identity number (IMEI). The identity response may also include an international mobile subscriber identity (IMSI) used to authenticate mobile device 110.

At 206, MME 104 communicates with AAA/HSS 112 to authenticate mobile device 110 based on the IMSI. MME 104 also authorizes mobile device 110 for access to, i.e., to attach to, enterprise fabric 102.

Enterprise fabric 102 uses MAC address-based constructs for routing traffic. Accordingly, at 208, MME 104 generates from the unique equipment identifier provided by mobile device 110 an enterprise identity for the mobile device. In an embodiment, MME 104 generates a pseudo MAC address as the enterprise identity for the mobile device, based on the IMEI of mobile device 110. The term "pseudo" means that the MAC address is not an actual, predetermined MAC address of the mobile device, but rather an artificial MAC address that is created to satisfy operational requirements of enterprise fabric 102.

At 210, MME 104 registers mobile device 110, i.e., the enterprise identity of the mobile device, in enterprise fabric 102. To do this, MME 104 registers the enterprise identity, e.g., the pseudo MAC address, in map server 106. MME 104 also registers other information in map server 106, including, e.g., a resource locator (RLOC) for switch SW1 at the edge of enterprise fabric 102 and through which small cell 108 connects to the enterprise fabric, and a security group tag (SGT) associated with a security group access control list (SGACL) used to enforce enterprise fabric policy at the switch.

At 212, MME 104 signals to a user plane function of the cellular network, e.g., to a user plane function of small cell 108, that the mobile device has been registered in enterprise fabric 102. This signal triggers the user plane function of small cell 108 to acquire an IP address for the enterprise identity of mobile device 110. That is, the user plane function of small cell 108 operates on behalf of mobile device 110 to acquire the IP address. The user plane function of small cell 108 uses the Dynamic Host Configuration Protocol (DHCP) to acquire the IP address for mobile device 110. For example, small cell 108 may invoke DHCP with switch SW1 (which serves as the enterprise fabric connection point to small cell 108) to acquire the IP address. Mobile device 110 does not initiate DHCP to acquire the IP address. In another example, the user plane function automatically generates the IP address as an IPv6 address using the pseudo MAC address and a configured IPv6 prefix.

At 214, the user plane function of small cell 108 sends to MME 104, and the MME receives, a message including the IP address acquired through DHCP.

At 216, MME 104 sends to mobile device 110 via small cell 108 an attach accept message that includes the acquired IP address for use by the mobile device. The attach accept message represents an indication that the attach procedure initiated at 204 has been completed successfully, i.e., that the enterprise fabric has processed the attach request successfully and is now configured to support a communication session with the mobile device through small cell 108.

With reference to FIGS. 3A-3E, there is an example thread diagram 300 (spanning FIGS. 3A-3E) that expands on operations 204-216 of method 200. Transactions and messages (referred to collectively as "transactions") of thread diagram 300 are enumerated using square brackets 3[1]-3[29]. The following list provides an approximate mapping between high-level operations 204-216 of method 200 performed primarily by MME 104 and selected ones of transactions 3[1]-3[29] that also primarily relate to MME operation:
 a. Receive and process attach request 204, includes transaction 3[2], 3[2.1].
 b. Authenticate and Authorize 206, includes transactions 3[3]-3[10].
 c. Generate enterprise identity 208, includes transaction 3[11].
 d. Register mobile device 210, includes transactions 3[12], 3[13].
 e. Signal user plane function of small cell to trigger acquisition of IP address 212, includes transactions 3[16], 3[17].
 f. Receive acquired IP address 214, includes transaction 3[18].
 g. Send attach accept message 216, includes transaction 3[20].

Figure 3A:
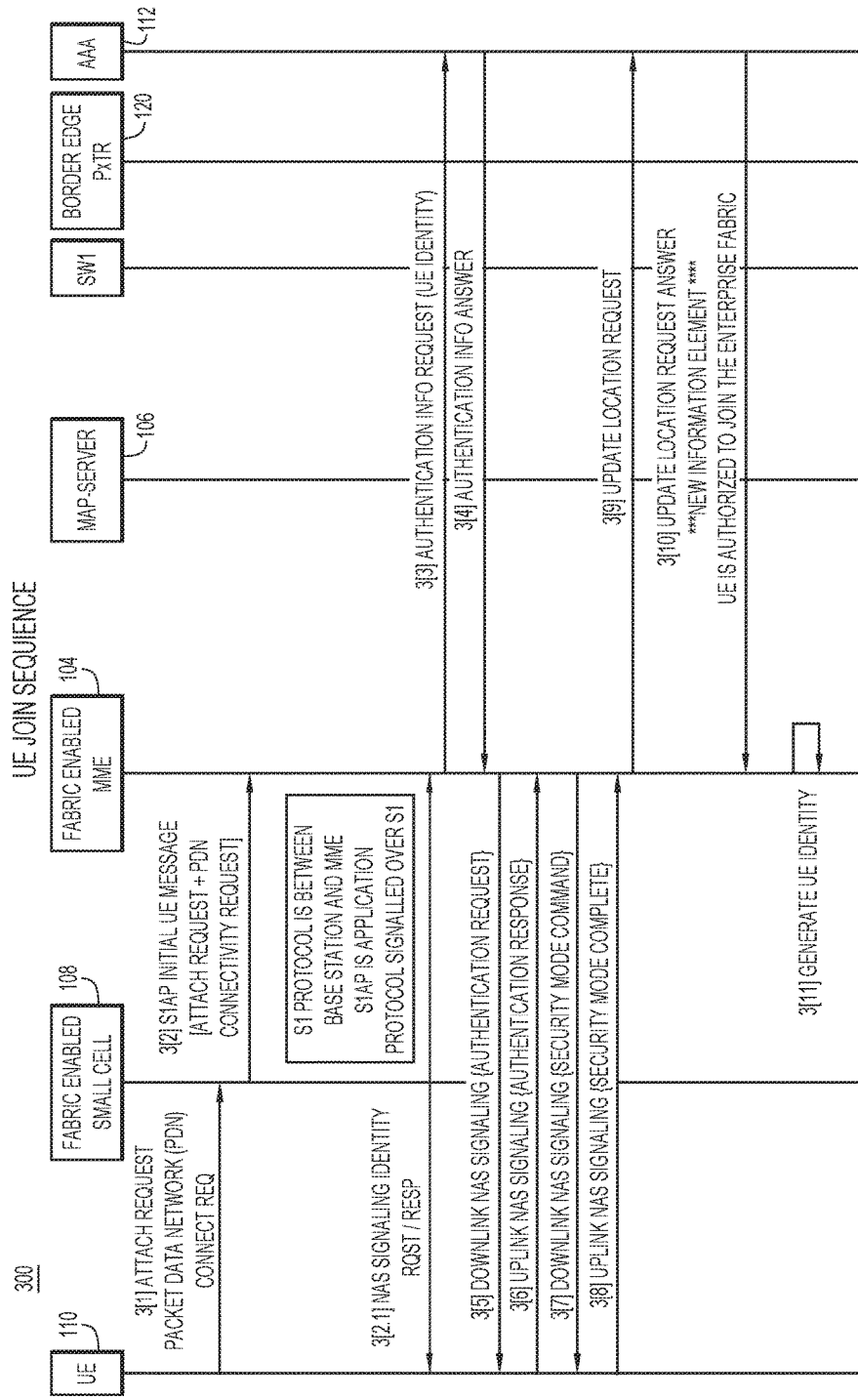

Reference is first made to FIG. 3A. At 3[1], mobile device 110 sends the above-mentioned attach request to small cell 108. The attach request includes a temporary identifier of mobile device 110. At 3[2], small cell 108 forwards the attach request, combined with a packet data network (PDN) request, to MME 104 over an S1 cellular interface. The attach request initiates an attach procedure in enterprise fabric 102 (and small cell 108).

At 3[2.1], responsive to the attach request, MME 104 exchanges with mobile device 110 NAS messages over uplink and downlink NAS signaling links to acquire from the mobile device multiple permanent mobile device identifiers, including an IMEI and an IMSI of the mobile device. The NAS signaling links use transport by the S1 AP protocol between MME 104 and small cell 108, and transport by Radio Resource Control (RRC) between the small cell and mobile device 110. Specifically, MME 104 signals to mobile device 110 an identity request NAS message via downlink NAS signaling. Responsive to the identity request, mobile device 110 signals to MME 104 an identity response NAS message via uplink NAS signaling. The identity request carries the IMEI and the IMSI.

At 3[3], 3[4], MME 104 interacts with AAA/HSS 112 to begin authentication of mobile device 110, based on the user equipment identifier provided to the AAA/HSS at 3[3].

At 3[5], MME 104 issues to mobile device 110 an authentication request NAS message via downlink NAS signaling. The authentication request includes information from AAA/HSS 112 received by MME 104 at 3[3]. At 3[6], MME 104 receives from mobile device 110 an authentication response NAS message via uplink NAS signaling.

At 3[7], MME 104 sends to mobile device 110 a security mode command NAS message via downlink NAS signaling. At 3[8], MME 104 receives from mobile device 110 a security mode complete NAS message via uplink NAS signaling. 3[7], 3[8] establish an encrypted connection with mobile device 110.

At 3[9], MME 104 sends to AAA/HSS 112 an update location request. At 3[10], MME 104 receives from AAA/HSS 112 an update location request answer. The answer indicates that mobile device 110 is authorized to join enterprise fabric 102.

At 3[11], responsive to the received authorization, MME 104 generates an enterprise identity (also referred to as "UE identity") for mobile device 110 based on the user equipment identifier of the mobile device. In an embodiment in which the user equipment identifier includes an IMEI, MME 104 generates the enterprise identity as a pseudo MAC address for mobile device 110 based on the IMEI. For example, MME 104 may generate the pseudo MAC address as a 48-bit combination of (i) a 24-bit reserved Institute of Electrical and Electronics Engineers (IEEE) organizationally unique identifier (OUI), followed by (ii) a 24-bit hash of at least a portion of the IMEI, which represents a 24-bit extension identifier. The IMEI includes a type allocation code (TAC) and a serial number of mobile device 110. The hash may include a hash of the TAC and the serial number. In enterprise fabric 102, the pseudo MAC address represents a layer-2 (L2) virtual extensible local area network (LAN) (VxLAN) network identifier (ID) (VNID) of mobile device 110.

Reference is now made to FIG. 3B. At 3[12], MME 104 registers mobile device 110 in enterprise fabric 102. To do this, MME 104 stores in map server 106 the L2 VNID (e.g., the pseudo MAC address) as an EID of mobile device 110. Also, MME 104 stores in map server 106, in type-length-value (TLV) form, an RLOC for switch SW1, along with a security group tag (SGT) and an associated IP address. At 3[13], map server 106 acknowledges the registration 3[12].

At 3[14], map server 106 notifies switch SW1 of the registration that occurred at 3[12], and provides the registration information from 3[12] to the switch. In response, switch SW1 creates an L2 entry for the L2 VNID (i.e., the pseudo MAC address) of mobile device 110. This entry will be used by switch SW1 to fetch SGACLs associated with the SGT for handling traffic for mobile device 110. In this way, switch SW1 becomes a point of policy enforcement for the traffic in enterprise fabric 102.

Reference is now made to FIG. 3C. At 3[15], map server 106 sends to border edge PxTR 120 an unsolicited solicited map request (SMR) message with respect to the L2 VNID (i.e., the pseudo MAC address), to cause the border edge PxTR to update its EID in a local cache.

Figure 3D:
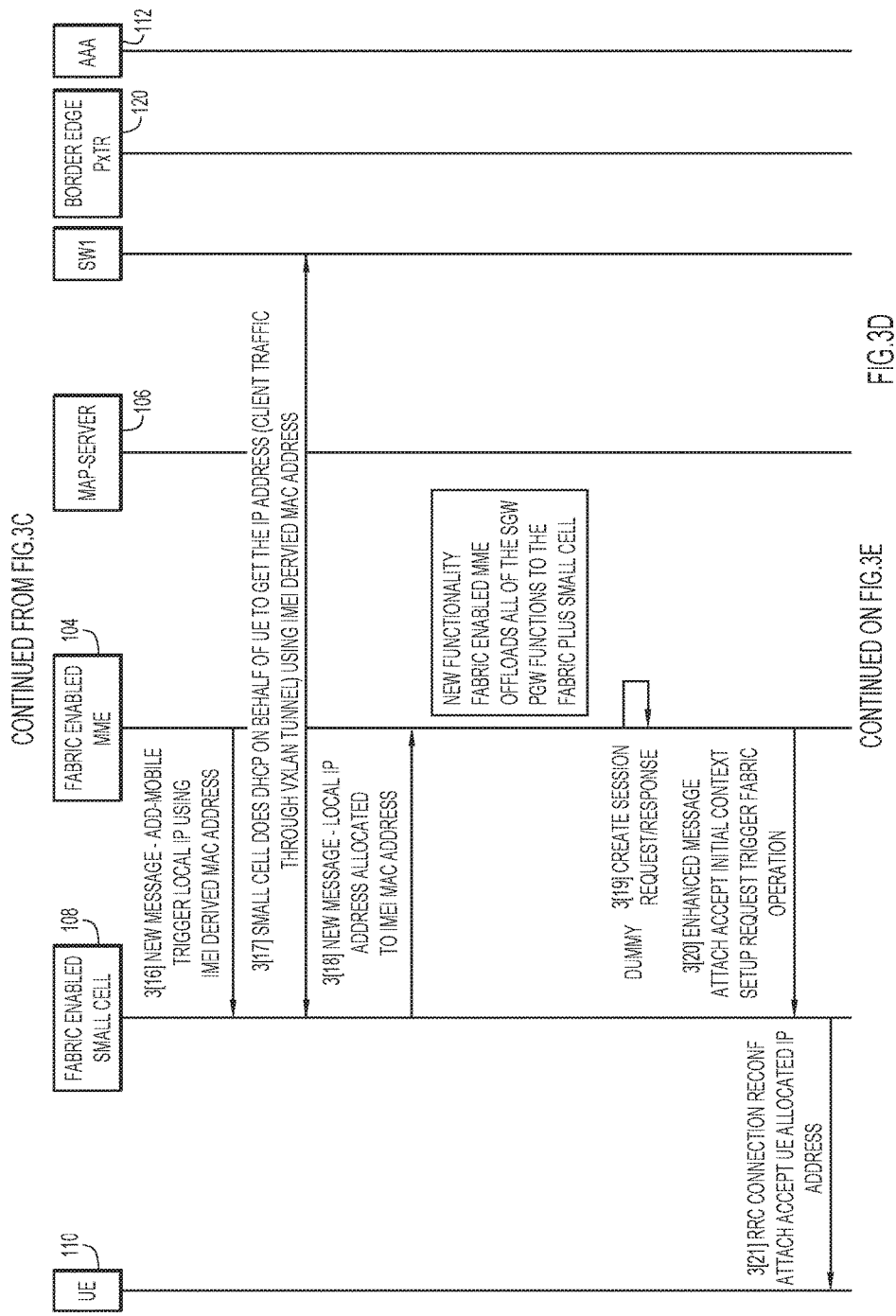

Reference is now made to FIG. 3D. At 3[16], MME 104 sends to the user plane function of small cell 108 an add-mobile message, which includes the pseudo MAC address of mobile device 110.

At 3[17], responsive to 3[16], the user plane function of small cell 108 performs DHCP with a DHCP server function accessible to switch SW1 to acquire an IP address for mobile device 110 based on the pseudo MAC address. The user plane function of small cell 108 receives the IP address from switch SW1. Thus, the result of 3[16] is to trigger the DHCP process in 3[17] to acquire the IP address. The IP address will be used to route mobile device traffic across enterprise fabric 102 through a VxLAN tunnel.

At 3[18], the user plane function of small cell 108 sends to MME 104 a message including the IP address.

At 3[19], MME 104 sends a dummy session request and a dummy session response to itself. The session request and response are normally exchanged with the SGW, which is omitted from the present embodiments.

At 3[20], responsive to the dummy session response, MME 104 sends to small cell 108 an attach accept message, which includes the IP address for mobile device 110. The attach accept indicates the attach procedure is complete, and that enterprise fabric 102 is operational with respect to connecting to mobile device.

Reference is now made to FIG. 3E. At 3[21], small cell 108 forwards to mobile device 110 the attach accept message (as an RRC connection reconfiguration command), including the IP address for the mobile device.

At 3[22], small cell 108 receives from mobile device 110 a reconfiguration complete message (as an RRC connection reconfiguration complete command).

At 3[23], small cell 108 sends to MME 104 an initial context setup complete message, indicating that mobile device 110 is configured to attach to enterprise fabric 102.

At 3[24], small cell 108 receives from mobile device 110 an attach complete signifying that the mobile device is attached enterprise fabric 102. At 3[25], small cell 108 forwards to MME 104 the attach complete.

At 3 [26], switch SW1 registers with map server 106 L2 information indicated in FIG. 3C for the Transmission Control Protocol (TCP). At 3[27], switch SW1 registers with map server 106 layer-3 (L3) information for virtual private network (VPN) routing and forwarding (VRF), as shown in FIG. 3C.

At 3[28], map server 106 forwards the L2 information registered at 3[26] to MME 104, which receives and stores the L2 information.

At 3[29], map server 106 sends to border edge PxTR 120 another unsolicited SMR message in connection with the L2 and L3 information described above.

Transactions 3[1]-3[29] of thread diagram 300 may be grouped into the following high-level functional operations:
 a. 3GPP UE (e.g., mobile device 110) authentication and initial attachment, initiate attach procedure—transactions 3[1]-3[8].
 b. UE location update and authorization—transactions 3[9], 3[10].
 c. Generate enterprise identity for UE—transaction 3[11].
 d. Register enterprise identity in SDA system (e.g., enterprise fabric 102)—transactions 3[12]-3[15], 3[26]-3[29].
 e. Add enterprise identity to user plane function in small cell 108—transaction 3[16], 3[18].
 f. User plane function in small cell 108 performs IP address allocation for UE—transaction 3[17].
 g. MME 104 completes attach procedure 3[19], 3[20].
 h. Signaling completed attach procedure to UE—transactions 3[19]-3[25].

Figure 4:
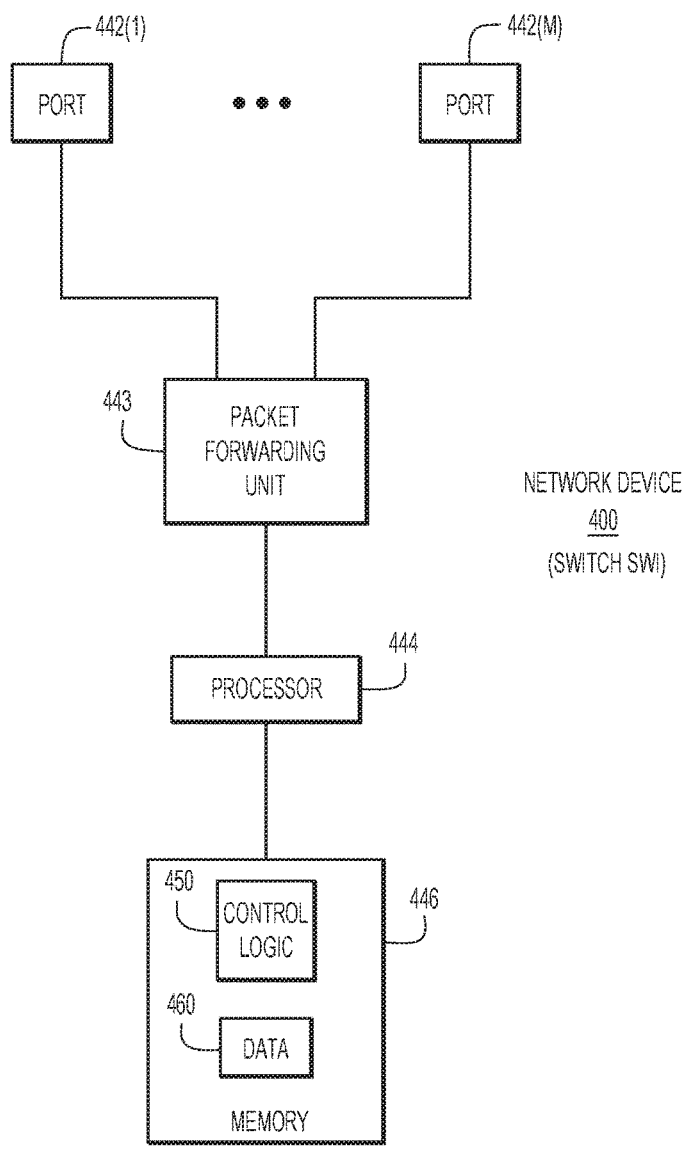
FIG. 4 is a block diagram of a network device representative of a switch at an edge of the enterprise fabric, according to an embodiment.

With reference to FIG. 4, there is a block diagram of an example network device 400 representative of switch SW1, e.g., a switch or router. Network device 400 comprises a network interface unit having a plurality of network input/output (I/O) ports 442(1)-442(M) to send traffic to and receive traffic from a network, and to forward traffic in the network, a packet forwarding/processing unit 443, a network processor 444 (also referred to simply as "processor"), and a memory 446. The packet forwarding/processing unit 443 is, for example, one or more application specific integrated circuits (ASICs) that include packet buffers, packet queues, and other control logic for performing packet forwarding operations. The processor 444 may include multiple processors, which may be implemented as software or hardware processors. For example, processor 444 may include a microcontroller or microprocessor that is configured to perform higher level controls of network device 400. To this end, the memory 446 stores software instructions that, when executed by the processor 444, cause the processor 444 to perform a variety of operations including operations described herein. For example, the memory 446 stores instructions for control logic 450 to perform operations described herein with respect to operations performed by switch SW1. Control logic 450 may also include logic components in packet forwarding unit 443.

Memory 446 also stores data 460 used and generated by logic 450.

Figure 5:
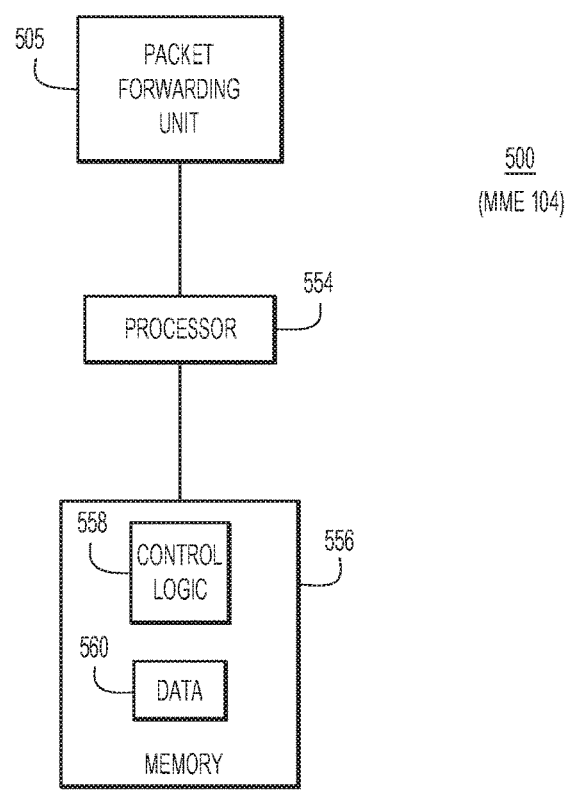
FIG. 5 is a block diagram of a computer device representative of a mobility management entity (MME) used to control the enterprise fabric, according to an embodiment.

With reference to FIG. 5, there is a block diagram of an example computer device 500 representative of MME 104. Computer device 500 includes network interface unit 505 to communicate with a wired and/or wireless communication network (e.g., an enterprise network, and a cellular network), and to control network devices over the network. Computer device 500 also includes a processor 554 (or multiple processors, which may be implemented as software or hardware processors), and memory 556. Network interface unit 505 may include an Ethernet card with a port (or multiple such devices) to communicate over wired Ethernet links and/or a wireless communication card with a wireless transceiver to communicate over wireless links.

Memory 556 stores instructions for implementing methods described herein. Memory 556 may include read only memory (ROM), random access memory (RAM), magnetic disk storage media devices, optical storage media devices, flash memory devices, electrical, optical, or other physical/tangible (non-transitory) memory storage devices. The processor 554 is, for example, a microprocessor or a microcontroller that executes instructions stored in memory. Thus, in general, the memory 556 may comprise one or more tangible computer readable storage media (e.g., a memory device) encoded with software comprising computer executable instructions and when the software is executed (by the processor 554) it is operable to perform the operations described herein relating to MME 104.

The memory 556 may also store data 560 used and generated by logic 558.

In summary, in one aspect, a method is provided comprising: at a mobility management entity (MME) configured to control an enterprise fabric: upon receiving from a mobile device via a cellular network a request to initiate an attach procedure, acquiring from the mobile device a unique equipment identifier of the mobile device; generating an enterprise identity for the mobile device based on the unique equipment identifier, and registering the enterprise identity in the enterprise fabric; signaling to a user plane function of the cellular network that the mobile device has been registered in the enterprise fabric, to trigger the user plane function to acquire an Internet Protocol (IP) address for the mobile device based on the enterprise identity; receiving from the user plane function of the cellular network a message indicating the acquired IP address; and sending to the mobile device via the cellular network an attach accept message that includes the acquired IP address for use by the mobile device, the attach accept message indicating that the attach procedure is complete, and that the enterprise fabric is configured to support a communication session with the mobile device through the cellular network.

The method may further comprise, responsive to the receiving the request, authenticating the mobile device, and authorizing the mobile device to attach to the enterprise fabric.

In one form, the generating includes generating the enterprise identity as a pseudo Ethernet media access control (MAC) address; and the registering includes registering the pseudo Ethernet MAC address in the enterprise fabric.

In one form, the unique equipment identifier of the mobile device includes at least a portion of an International Mobile Equipment Identity number (IMEI); and the generating further includes generating the pseudo Ethernet MAC address based in part on the IMEI.

The generating may further include generating the pseudo Ethernet MAC address as a combination of (i) a reserved Institute of Electrical and Electronics Engineers (IEEE) organizationally unique identifier (OUI), and (ii) a hash of the IMEI.

The registering may further include further includes registering with a map server accessible to the enterprise fabric, and wherein: the pseudo Ethernet MAC address as an endpoint identifier (EID); a resource locator (RLOC) for a switch at an edge of the enterprise fabric and through which a cell of the cellular network connects to the enterprise fabric; and a security group tag (SGT) associated with a security group access control list (SGACL) used to enforce enterprise fabric policy.

Each of the signaling, the receiving from the user plane function of the cellular network the message indicating the acquired IP address, and the sending to the mobile device via the cellular network the attach accept message that includes the acquired IP address may be performed without interacting with a serving gateway (SGW) and without interacting with a packet data network gateway (PGW) of any network.

The enterprise fabric may be implemented as Software Defined Access (SDA) including an overlay network built on an underlay network, the overlay network including a virtual layer having a fabric control plane, a fabric data plane, and a fabric policy plane, the underlay network including a physical layer having physical network devices.

In another aspect, an apparatus is provided comprising: a network interface to communicate with an enterprise fabric; and a processor coupled to the network interface and configured to control the enterprise fabric, the processor further configured to: upon receiving from a mobile device via a cellular network a request to initiate an attach procedure, acquire from the mobile device a unique equipment identifier of the mobile device; generate an enterprise identity for the mobile device based on the unique equipment identifier, and registering the enterprise identity in the enterprise fabric; signal to a user plane function of the cellular network that the mobile device has been registered in the enterprise fabric, to trigger the user plane function to acquire an Internet Protocol (IP) address for the mobile device based on the enterprise identity; receive from the user plane function of the cellular network a message indicating the acquired IP address; and send to the mobile device via the cellular network an attach accept message that includes the acquired IP address for use by the mobile device, the attach accept message indicating that the attach procedure is complete, and that the enterprise fabric is configured to support a communication session with the mobile device through the cellular network.

In yet another aspect, a non-transitory computer readable medium that stores instructions is provided. The instructions, when executed by a processor, cause the processor to perform: upon receiving from a mobile device via a cellular network a request to initiate an attach procedure, acquiring from the mobile device a unique equipment identifier of the mobile device; generating an enterprise identity for the mobile device based on the unique equipment identifier, and registering the enterprise identity in the enterprise fabric; signaling to a user plane function of the cellular network that the mobile device has been registered in the enterprise fabric, to trigger the user plane function to acquire an Internet Protocol (IP) address for the mobile device based on the enterprise identity; receiving from the user plane function of the cellular network a message indicating the acquired IP address; and sending to the mobile device via the cellular network an attach accept message that includes the acquired IP address for use by the mobile device, the attach accept message indicating that the attach procedure is complete, and that the enterprise fabric is configured to support a communication session with the mobile device through the cellular network.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
  at a mobility management entity (MME) configured to control an enterprise fabric:
    upon receiving from a mobile device via a cellular network a request to initiate an attach procedure, acquiring from the mobile device a unique equipment identifier of the mobile device;
    generating an enterprise identity for the mobile device based on the unique equipment identifier, and registering the enterprise identity in the enterprise fabric;
    signaling to a user plane function of the cellular network that the mobile device has been registered in the enterprise fabric, to trigger the user plane function to acquire an Internet Protocol (IP) address for the mobile device based on the enterprise identity;
receiving from the user plane function of the cellular network a message indicating the acquired IP address; and
sending to the mobile device via the cellular network an attach accept message that includes the acquired IP address for use by the mobile device, the attach accept message indicating that the attach procedure is complete, and that the enterprise fabric is configured to support a communication session with the mobile device through the cellular network.

2. The method of claim 1, further comprising, responsive to the receiving the request, authenticating the mobile device, and authorizing the mobile device to attach to the enterprise fabric.

3. The method of claim 1, wherein:
the generating includes generating the enterprise identity as a pseudo Ethernet media access control (MAC) address; and
the registering includes registering the pseudo Ethernet MAC address in the enterprise fabric.

4. The method of claim 3, wherein:
the unique equipment identifier of the mobile device includes at least a portion of an International Mobile Equipment Identity number (IMEI); and
the generating further includes generating the pseudo Ethernet MAC address based in part on the IMEI.

5. The method of claim 4, wherein the generating further includes generating the pseudo Ethernet MAC address as a combination of (i) a reserved Institute of Electrical and Electronics Engineers (IEEE) organizationally unique identifier (OUI), and (ii) a hash of the IMEI.

6. The method of claim 3, wherein the registering further includes registering with a map server accessible to the enterprise fabric, and wherein:
the pseudo Ethernet MAC address as an endpoint identifier (EID);
a resource locator (RLOC) for a switch at an edge of the enterprise fabric and through which a cell of the cellular network connects to the enterprise fabric; and
a security group tag (SGT) associated with a security group access control list (SGACL) used to enforce enterprise fabric policy.

7. The method of claim 1, performing each of the signaling, the receiving from the user plane function of the cellular network the message indicating the acquired IP address, and the sending to the mobile device via the cellular network the attach accept message that includes the acquired IP address without interacting with a serving gateway (SGW) and without interacting with a packet data network gateway (PGW) of any network.

8. The method of claim 1, wherein the cellular network includes a 3rd Generation Partnership Project (3GPP) network small cell.

9. The method of claim 1, wherein the enterprise fabric is implemented as Software Defined Access (SDA) including an overlay network built on an underlay network, the overlay network including a virtual layer having a fabric control plane, a fabric data plane, and a fabric policy plane, the underlay network including a physical layer having physical network devices.

10. An apparatus comprising:
a network interface to communicate with an enterprise fabric; and
a processor coupled to the network interface and configured to control the enterprise fabric, the processor further configured to:
upon receiving from a mobile device via a cellular network a request to initiate an attach procedure, acquire from the mobile device a unique equipment identifier of the mobile device;
generate an enterprise identity for the mobile device based on the unique equipment identifier, and registering the enterprise identity in the enterprise fabric;
signal to a user plane function of the cellular network that the mobile device has been registered in the enterprise fabric, to trigger the user plane function to acquire an Internet Protocol (IP) address for the mobile device based on the enterprise identity;
receive from the user plane function of the cellular network a message indicating the acquired IP address; and
send to the mobile device via the cellular network an attach accept message that includes the acquired IP address for use by the mobile device, the attach accept message indicating that the attach procedure is complete, and that the enterprise fabric is configured to support a communication session with the mobile device through the cellular network.

11. The apparatus of claim 10, wherein the apparatus if further configured to, responsive to the receiving the request, authenticate the mobile device, and authorize the mobile device to attach to the enterprise fabric.

12. The apparatus of claim 10, wherein the processor is configured to:
generate by generating the enterprise identity as a pseudo Ethernet media access control (MAC) address; and
register by registering the pseudo Ethernet MAC address in the enterprise fabric.

13. The apparatus of claim 12, wherein:
the unique equipment identifier of the mobile device includes at least a portion of an International Mobile Equipment Identity number (IMEI); and
the processor is further configured to generate by generating the pseudo Ethernet MAC address based in part on the IMEI.

14. The apparatus of claim 13, wherein the processor is further configured to generate by generating the pseudo Ethernet MAC address as a combination of (i) a reserved Institute of Electrical and Electronics Engineers (IEEE) organizationally unique identifier (OUI), and (ii) a hash of the IMEI.

15. The apparatus of claim 12, wherein the processor is further configured to register by registering with a map server accessible to the enterprise fabric:
the pseudo Ethernet MAC address as an endpoint identifier (EID);
a resource locator (RLOC) for a switch at an edge of the enterprise fabric and through which a cell of the cellular network connects to the enterprise fabric; and
a security group tag (SGT) associated with a security group access control list (SGACL) used to enforce enterprise fabric policy.

16. The apparatus of claim 10, wherein the processor is configured to perform each of the signal, the receive from the user plane function of the cellular network the message indicating the acquired IP address, and the send to the mobile device via the cellular network the attach accept message that includes the acquired IP address without interacting with a serving gateway (SGW) operations without interacting with a packet data network gateway (PGW) of any network.

17. The apparatus of claim 10, wherein the cellular network includes a 3$^{rd}$ Generation Partnership Project (3GPP) network small cell.

18. A non-transitory computer readable medium encoded with instructions that, when executed by a processor of a mobility management entity (MME) configured to control an enterprise fabric, cause the processor to perform:
   upon receiving from a mobile device via a cellular network a request to initiate an attach procedure, acquiring from the mobile device a unique equipment identifier of the mobile device;
   generating an enterprise identity for the mobile device based on the unique equipment identifier, and registering the enterprise identity in the enterprise fabric;
   signaling to a user plane function of the cellular network that the mobile device has been registered in the enterprise fabric, to trigger the user plane function to acquire an Internet Protocol (IP) address for the mobile device based on the enterprise identity;
   receiving from the user plane function of the cellular network a message indicating the acquired IP address; and
   sending to the mobile device via the cellular network an attach accept message that includes the acquired IP address for use by the mobile device, the attach accept message indicating that the attach procedure is complete, and that the enterprise fabric is configured to support a communication session with the mobile device through the cellular network.

19. The non-transitory computer readable medium of claim 18, wherein the instructions include instructions to cause the processor to perform:
   generating the enterprise identity as a pseudo Ethernet media access control (MAC) address; and
   registering the pseudo Ethernet MAC address in the enterprise fabric.

20. The non-transitory computer readable medium of claim 19, wherein:
   the unique equipment identifier of the mobile device includes at least a portion of an International Mobile Equipment Identity number (IMEI); and
   the instructions include instructions to cause the processor to perform generating the pseudo Ethernet MAC address based in part on the IMEI.

* * * * *